2 Sheets—Sheet 1.
L. CHAPMAN.
Wheel-Plow.
No. 225,744. Patented Mar. 23, 1880.
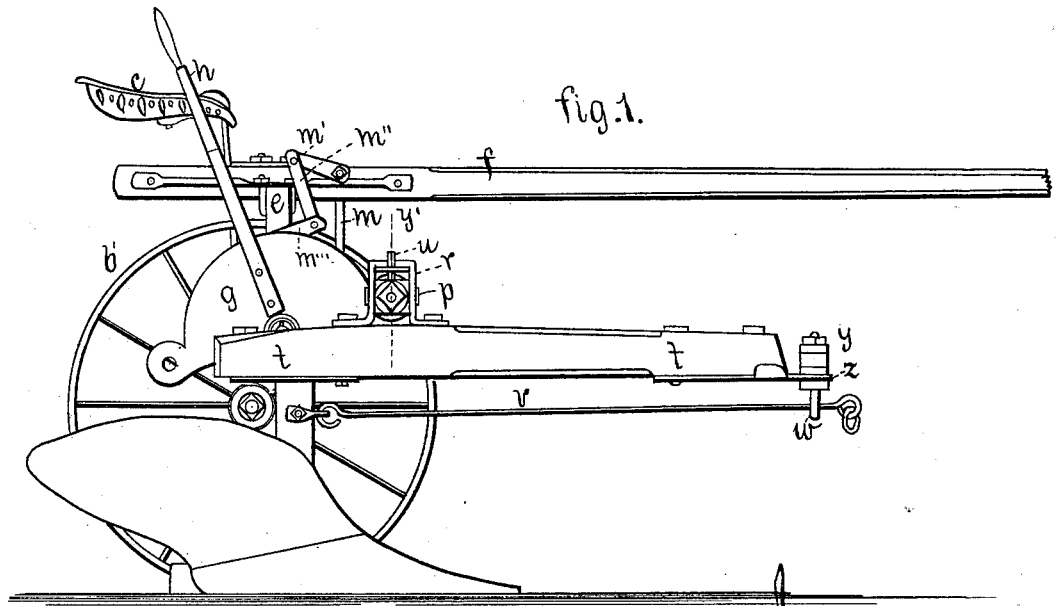
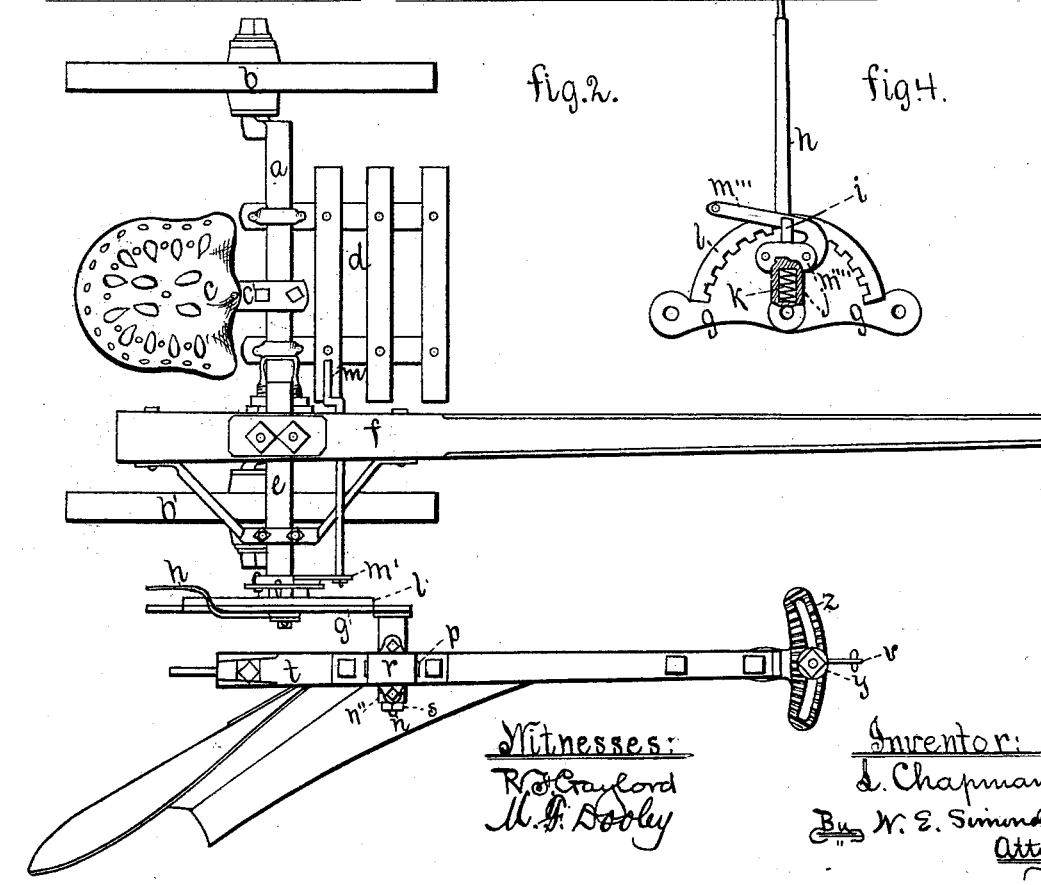

L. CHAPMAN.
Wheel-Plow.

No. 225,744. Patented Mar. 23, 1880.

Witnesses:
R. J. Gaylord
M. E. Dooley

Inventor:
L. Chapman
By W. E. Simonds
Atty

UNITED STATES PATENT OFFICE.

LUKE CHAPMAN, OF COLLINSVILLE, CONN., ASSIGNOR OF ONE-HALF OF HIS RIGHT TO THE COLLINS COMPANY, OF SAME PLACE.

WHEEL-PLOW.

SPECIFICATION forming part of Letters Patent No. 225,744, dated March 23, 1880.

Application filed December 6, 1879.

*To all whom it may concern:*

Be it known that I, LUKE CHAPMAN, of Collinsville, in the county of Hartford and State of Connecticut, have invented certain new and useful Improvements in Wheeled Plows, of which the following is a specification, reference being had to the accompanying drawings, where—

Figure 3:
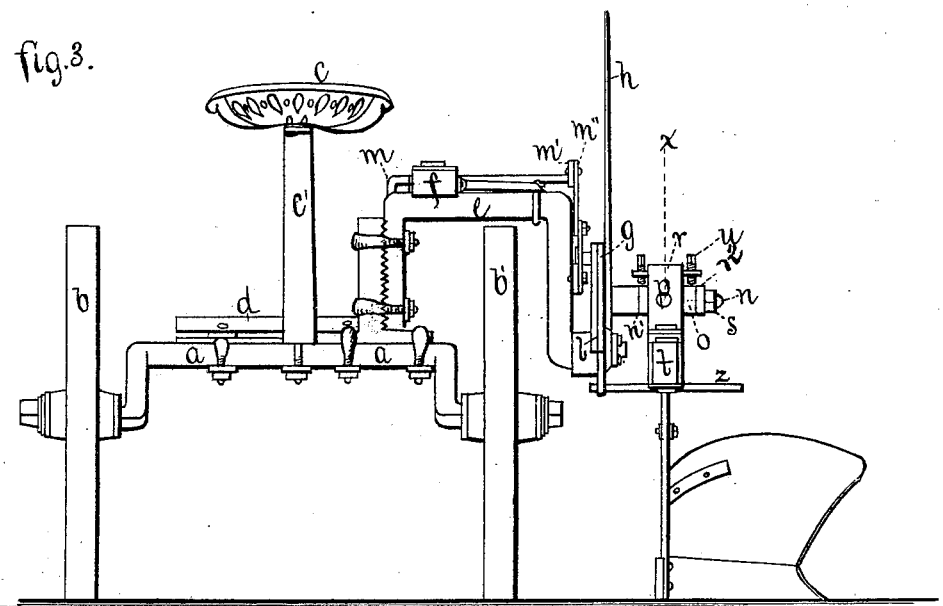
Figure 5:
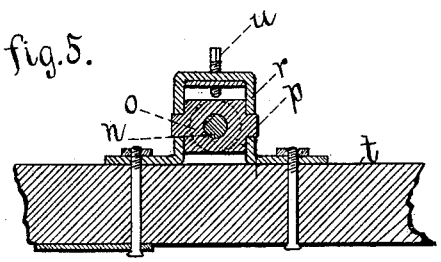
Figure 6:
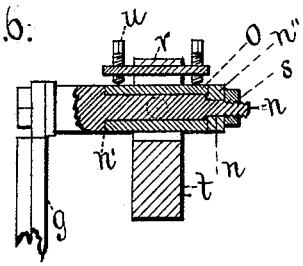

Figure 1 is a side view. Fig. 2 is a top view. Fig. 3 is a rear view. Fig. 4 is a view of the parti-disk, hereinafter described, from the opposite side of that shown in Fig. 1. Fig. 5 is a detail sectional view, on plane $x$, of the crank-pin, to be yet described. Fig. 6 is a view of the same on plane $y$.

In this apparatus the plow is carried at one side of the wheeled carriage, permitting the wheels to run on the unbroken land.

The letter $a$ denotes the axle of the wheeled carriage, preferably cranked, as shown in the drawings, to attain a desirable elevation and advancement of the base, to which the seat and the wheel-bridging arm are attached.

The letters $b$ $b'$ respectively denote the "near" and "off" wheels of the wheeled carriage, and $c$ denotes the driver's seat capping the standard $c'$, which, at its foot, is suitably bolted to the main axle $a$. The letter $d$ denotes the driver's foot-rest springing from the main axle.

The letter $e$ denotes the wheel-bridging arm, which I will term the "wheel-bridge." It starts inside the wheels from (mediately) the main axle, runs over the wheel, and on the outer end bears (mediately) the plow proper. It might, so far as this function of traversing or bridging the wheel is concerned, pass through the center of the wheel—that is, the plow might be borne on an arm starting from the axle outside the wheel; but to have this wheel-bridge run over or around the periphery of the wheel I consider preferable, that it may thereby serve certain purposes hereinafter set forth.

The inner end of the wheel-bridge is connected to the main axle through the medium of a T-joint, the horizontal arms of which lie upon and are bolted to the main axle, and the vertical arm of which lies alongside of and is bolted to the inner leg of the wheel-bridge, the meeting surfaces of the two being correspondingly serrated to make their mutual hold firm.

In the drawings the machine is shown as fitted with a right-hand plow. The T-joint, bearing the wheel-bridge, can be removed from the position shown and be bolted to the main axle, so that the wheel-bridge shall overlie the opposite wheel $b$, and the machine thus be adapted to carrying a left-hand plow. The movability of the wheel-bridge upon the vertical arm of the T-joint renders the wheel-bridge, and consequently the plow, vertically adjustable upon the wheeled carriage.

The pole $f$ is bolted to the summit or horizontal arm of the wheel-bridge. On the outer leg of the wheel-bridge there is pivotally hung a parti-disk, $g$, serving (as one of its functions) as an arm, to the outer end of which the plow is mediately hung. A lever, $h$, made fast to this parti-disk and extending to within reach of the driver, serves to permit the driver to partially rotate the parti-disk, and so raise and lower the plow. The parti-disk is kept at any desired rotary adjustment by means of a pawl, $i$, lying and sliding in a pawl-case, $j$, attached to the outer arm of the wheel-bridge, and pressed outwardly by a spring, $k$, contained in the pawl-case, to mesh with the teeth of an internal ratch-gear, $l$, borne on the side of the parti-disk. The driver unmeshes this pawl from the ratch-gear at desired times by pressing outwardly with his foot upon the lower end of the crank-arm $m$, journaled in the pole $f$, and bearing the lever-arm $m'$, with connecting-rod $m''$ at its end running down to lever $m'''$, which is pivoted on an ear, $m''''$, projecting from the wheel-bridge, and overlies a portion of the top of pawl $i$. On the side of the wheel-bridge opposite from the ear $m''''$ there is another and corresponding ear, for use and service when the machine is adjusted for carrying a left-hand plow.

The parti-disk would suffice for carrying a right-hand plow only, or vice versa, if it were a quadrant or quarter-disk; but to adapt it for carrying either a right-hand or left-hand plow it is made as a half-disk, and so that the crank-pin on which the plow is hung can be fastened to either extremity.

The letter $n$ denotes a crank-pin hung at the outer end of the parti-disk, and on the crank-pin is rotarily hung, between the shoulder $n'$ and the washer $n''$, the sleeve $o$, bearing at front and rear the trunnions $p\ p$, journaled in the frame $r$, bolted fast to the plow-beam $t$.

This construction, as so far described, permits the plow-beam to rotate on the crank-pin in a vertical plane, the plow proper having a corresponding motion, and also permits the plow to oscillate or rotate from side to side, pendulum-like, on the trunnions $p$, both of these motions having their uses in the adjustment of the plow for practical work. These motions are, as is desirable, controllable. The crank-pin $n$, inside the washer $n''$, is square. The central hole through the washer is correspondingly square—this to prevent the motion of the sleeve $o$ from rotating this washer and the nut $s$ behind it. By screwing up the nut $s$ the sleeve $o$ will be so tightly pressed or pinched between washer $n''$ and shoulder $n'$ that the plow-beam will not have up-and-down play from slight forces—such, for instance, as the weight of the evener and whiffletrees, which are carried at the end of the beam—but will have motion from greater forces—such, for instance, as the draft exerted by the team of horses.

The pendulum-like motion is controlled by the screws $u\ u$, hung in the frame $r$, and bearing on the sleeve $o$ on either side of the trunnions $p$.

The draft-line of a plow is, speaking in general terms, in front of the center of the width of the mold-board. The draft-line of this machine is something different because of the wheeled carriage, and therefore the draft needs to be adjustably applied. Such adjustability is attained by pivoting the draft-rod $v$ at its rear end to the standard of the plow, its front end running through the ring $w$, which, by set-nut $y$, can be held at any desired point on the clevis-arc $z$. This wheeled plow, as hereinbefore shown and described, is designed to be drawn by three horses, one each side of the pole walking on the unbroken land and one walking in the furrow.

The term "wheeled carriage" in the following claims means a combination of two or more wheels and an axle, or its equivalent.

It will be readily seen that the mechanism herein described for allowing the so-called "pendulum-like" motion of the plow is applicable to the case where the part $o$ is a solid instead of a hollow shaft or sleeve, and the term "sleeve," as hereinafter used in the claims, is meant to include the solid as well as the hollow shaft.

I claim as my invention—

1. In a wheeled plow, the combination of the wheeled carriage, a wheel-bridge adaptable to both wheels, and a plow borne by the wheel-bridge outside and on either side the wheels, substantially as shown and described.

2. In a wheeled plow, the combination of the wheeled carriage, the T-joint, the wheel-bridge, and the plow borne outside the wheels, substantially as shown and described.

3. In a wheeled plow, the combination of the wheeled carriage, the wheel-bridge, the parti-disk pivotally hung to the wheel-bridge, and the plow pivotally hung to the parti-disk, substantially as shown and described.

4. In a wheeled plow, the combination of the wheeled carriage, the wheel-bridge, the parti-disk pivotally hung to the wheel-bridge, the plow pivotally hung to the parti-disk, the lever for operating the parti-disk, and the pawl-and-ratch gear for retaining the parti-disk in adjustment, substantially as shown and described.

5. The combination of the plow-beam $t$, with its standard, mold-board, and share, the frame $r$, screws $u\ u$, and the sleeve $o$, bearing the trunnions $p\ p$, all substantially as shown and described.

6. In a wheeled plow, the combination of the wheeled carriage, the wheel-bridge, the parti-disk pivotally hung to the wheel-bridge, the crank-pin $n$, the sleeve $o$, with its trunnions $p\ p$, the frame $r$, and the plow-beam $t$, with its standard, mold-board, and share, all substantially as shown and described.

LUKE CHAPMAN.

Witnesses:
OLIVER F. PERRY,
CHARLES W. THAYER.